United States Patent [19]

Witucki et al.

[11] Patent Number: 4,876,154

[45] Date of Patent: Oct. 24, 1989

[54] COMPOSITE WOOD STRUCTURES BONDED BY POLY(VINYL ACETATE) EMULSION ADHESIVES CONTAINING AN ALKOXYSILANE

[75] Inventors: Gerald L. Witucki; Edwin P. Plueddemann, both of Midland, Mich.

[73] Assignee: Dow Corning Corporation, Midland, Mich.

[21] Appl. No.: 249,061

[22] Filed: Sep. 26, 1988

Related U.S. Application Data

[62] Division of Ser. No. 125,438, Nov. 25, 1988, Pat. No. 4,818,779.

[51] Int. Cl.$^4$ ................................................. B32B 9/04
[52] U.S. Cl. ................................... 428/447; 428/481; 428/514; 428/511; 156/326
[58] Field of Search ............... 428/447, 481, 511, 514; 156/326

[56] References Cited

U.S. PATENT DOCUMENTS

| | | | |
|---|---|---|---|
| 3,214,402 | 10/1965 | Gobel | 523/205 |
| 3,418,094 | 12/1968 | Marsden et al. | 65/3.41 |
| 3,736,283 | 5/1973 | Taylor | 524/262 |
| 3,772,237 | 11/1973 | Bullman | 524/188 |
| 3,813,351 | 5/1974 | Thomson | 523/414 |
| 4,133,789 | 1/1979 | Lakshmanan | 156/322 |
| 4,133,794 | 1/1979 | Lamb | 524/296 |
| 4,698,383 | 10/1987 | Mertz et al. | 524/314 |

FOREIGN PATENT DOCUMENTS

043127 6/1982 European Pat. Off. .
102646 8/1975 Japan .

Primary Examiner—Joseph L. Schofer
Assistant Examiner—J. M. Reddick
Attorney, Agent, or Firm—Alexander Weitz

[57] ABSTRACT

The present invention relates to water-born emulsion adhesives based on polymers or copolymers of vinyl acetate and having uniformly dispersed therein an adhesion promoter consisting essentially of an alkoxysilane and up to about 80% by weight of a plasticizer for the poly(vinyl acetate). The alkoxysilane useful herein may be selected from

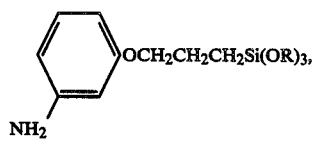

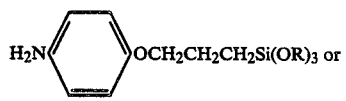

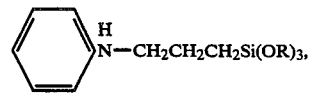

in which R is independently selected from alkyl or alkoxyalkyl radicals having 1–4 carbon atoms. The modified adhesives have improved bond strength to wood, particularly after exposure to moisture.

13 Claims, No Drawings

COMPOSITE WOOD STRUCTURES BONDED BY POLY(VINYL ACETATE) EMULSION ADHESIVES CONTAINING AN ALKOXYSILANE

The present invention relates to an improved adhesive composition. More particularly, the present invention relates to a water-borne emulsion adhesive, based on a polymer or copolymer of vinyl acetate, having uniformly dispersed therein an adhesion promoter consisting essentially of an alkoxysilane and a plasticizer.

BACKGROUND OF THE INVENTION

Poly(vinyl acetate) resins are well known in the art and have been extensively employed in water-borne emulsion form as adhesives for bonding various substrates such as cellulosic material, plastics, ceramics and metals. Additionally, the use of adhesion promoters, particularly various organofunctional silanes, has been widely practiced in augmenting the strength and water resistance of plastic composites and adhesive joints. Thus, in U.S. Pat. No. 3,736,283 to Taylor, for example, is concept was applied to increase the adhesion of water-based emulsions of ethylene/vinyl acetate copolymer by the incorporation of a mercaptosilane. The resultant adhesive compositions are said to have particularly improved adhesion to plastics.

Notwithstanding the improved adhesion attained in poly(vinyl acetate) emulsions imparted by the addition of various silane coupling agents, those skilled in the art recognize the need for even further improvement, particularly in connection with the formation of more water resistant bonds to cellulosic materials such as wood and paper.

SUMMARY OF THE INVENTION

It has now been found that an adhesion promoter consisting essentially of a compound selected from a particular group of alkoxysilanes and, optionally, a plasticizer for poly(vinyl acetate) may be advantageously added to the above described poly(vinyl acetate) emulsions to provide adhesives having improved bond strength and water resistance when applied to wood substrates. Unexpectedly, alkoxysilanes having quite similar chemical structures to those of the present invention were found to be ineffective in this regard. The present invention therefore relates to a composition comprising:

(i) a water-borne emulsion adhesive based on a poly(vinyl acetate) resin;and (ii) an adhesion promoter consisting essentially of at least one alkoxysilane selected from

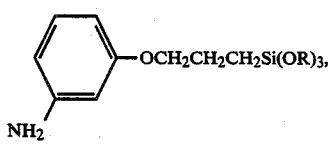

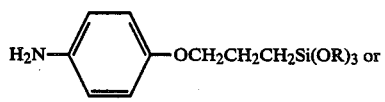

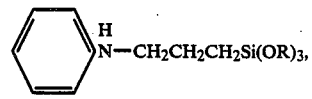

in which R is independently selected from alkyl or alkoxyalkyl radicals having 1 - 4 carbon atoms, and up to about 80% by weight of a plasticizer for said poly(vinyl acetate) resin, wherein said alkoxysilane constitutes from about 0.5 to 5.0 percent by weight of said composition.

The present invention further relates to a wood composite structure which is bonded by the above adhesive composition.

DETAILED DESCRIPTION OF THE INVENTION

The compositions of the present invention comprise (i) a water-borne emulsion (i.e., a latex) poly(vinyl acetate) resin adhesive, having uniformly dispersed therein an adhesion promoter (ii). The adhesion promoter, in turn, consists essentially of an alkoxysilane and, optionally, up to about 80 percent by weight of a plasticizer for the poly(vinyl acetate) resin.

The water-borne emulsion adhesives based on poly(vinyl acetate) resin of component (i) of the present invention are well known in the art. They are generally prepared by emulsion polymerization techniques wherein typically small quantities of wetting agents, protective colloids, polymerization initiator and a molecular weight regulator, may be included in addition to vinyl acetate monomer and water. For an extensive review, the interested reader is directed to articles such as "Vinyl Polymers (Acetate)" in the Kirk-Othmer Encyclopedia, Volume 23, (J. Wiley & Sons, 1983) and "Vinyl Ester Polymers" in the Encyclopedia of Polymer Science and Technology, Volume 15 (J. Wiley & Sons, 1971).

The poly(vinyl acetate) resin (hereinafter PVAc) employed in the adhesives of the present invention may include an external plasticizer, such as those described in connection with component (ii), infra. Alternatively, an internal plasticization of the poly(vinyl acetate) resin may be achieved by copolymerizing the vinyl acetate monomer with up to about 50 mole percent of monomers such as dibutyl maleate, dibutyl fumarate, di(2-ethylhexyl) maleate, di(ethylhexyl) fumarate, butyl acrylate, 2-ethylhexyl acrylate, ethyl acrylate, vinyl laurate, ethylene, and the like. In either event, plasticization results in the usual reduction of the glass transition temperature and modifies other physical properties such as tensile strength and heat sealing temperature, as is well known in the polymer arts. For the purposes of the present invention, the water-borne adhesive (i) is employed, as commonly supplied in the art, at a solids (i.e., non-volatile) content of about 40 to 60 weight percent. Preferably, the PVAc resin is a homopolymer of vinyl acetate.

Many proprietary formulations of PVAc adhesive emulsions are available commercially. Preferred systems are the so-called "white glues" commonly employed in wood laminating and bonding applications. These include the CASCOREZ series marketed by Borden Chemical Co. (Columbus, OH), such as CASCOREZ WB-798, CASCOREZ WB-851, CASCOREZ WB-732 and CASCOREZ WB-864. Other suitable emulsion adhesives include RES 202A, available from the Union Chemical Co. (Schaumburg, IL) and the MULTIBOND family from Franklin Chemical Industries (Columbus, OH). The MULTIBOND family is based on crosslinkable resins and may be cured when a catalyst is included by heat, as generated by radio frequency fields, for example.

The adhesion promoter (ii) of the present invention consists essentially of at least one alkoxysilane selected from the following structures:

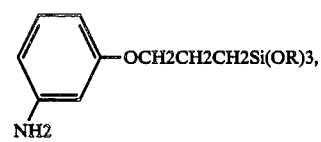

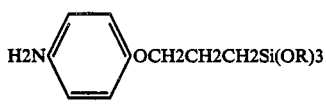

or

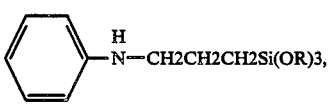

and, optionally, a plasticizer for the PVAc. In the above formulae, R is independently selected from alkyl or alkoxyalkyl radicals having 1–4 carbon atoms. Specific examples of R groups contemplated herein include radicals such as methyl, ethyl, propyl, butyl, isopropyl, methoxyethyl, ethoxyethyl and isobutyl. It is preferred that R is the methyl radical in each of these formulae. Between the isomeric structures (I) and (II), structure (I) is preferred.

The alkoxysilanes of formulae (I) and (II) are known in the art and may be prepared by first reacting aminophenol (i.e., the meta- or para- aminophenol, respectively) with aqueous NaOH in the presence of a solvent system which forms an azeotrope with the included water. After the water is driven off in the azeotrope, the remaining mixture is heated with a 3-chloropropyltrialkoxysilene and the salt formed in the reaction is filtered off and the product is refined by distillation under vacuum. The alkoxysilane of formula (III) is also known in the art and the trimethoxysilane is available from Petrarch Systems (Bristol, PA). It may be prepared by a hydrosilation reaction between N-allylaniline and a trialkoxysilane using a platinum catalyst to promote the SiH addition to the carbon-carbon double bond.

The adhesion promoter (ii) may contain up to about 80 percent by weight of a plasticizer for the poly(vinyl acetate) resin. Preferably, the adhesion promoter contains from about 1 to 80 percent by weight of the plasticizer, a range of 10 to 80 being most preferred. These compounds are well known in the art and may be selected from esters having hydrocarbyl groups of up to about six carbon atoms, such as dibutyl phthalate, diethyl phthalate, dimethyl phthalate, butyl benzyl phthalate, tricresyl phosphate, diphenyl phosphate, triphenyl phosphate, dipropylene glycol dibenzoate, diethylene glycol dibenzoate, cresyl diphenyl phosphate and dibutyl sebacate.

Preferred plasticizers of the present invention are selected from polymeric esters such as those formed by reacting phthalic anhydride (or isophthalic acid) with a glycol having from 2 to 4 carbon atoms in its main chain, such as ethylene glycol, propylene glycol, and butylene glycol. Typically, these "alkyd" esters are reacted to obtain a desired acid number which is related to the carboxyl group content of the product and are well known in the art.

Many proprietary polymeric esters are available commercially and are preferred for use in the compositions of the present invention. Thus, the PARAPLEX series of plasticizers, such as PARAPLEX G-25 and PARAPLEX G-40, offered by Rohm and Haas (Philadelphia, PA), the RESOFLEX resinous plasticizers, such as RESOFLEX R-296 and RESOFLEX R-446, produced by Cambridge Industries Company (Watertown, MA), and PLASTHALL P-622 polymeric plasticizer, produced by C. P. Hall Company (Chicago, IL), are highly preferred, particularly the latter.

As is also well recognized in the art, the adhesive compositions of the present invention may include other adjuvants which impart desired properties or reduce the cost of the final formulations. Examples of such additional ingredients include thickeners, fillers, solvents, crosslinkers, catalysts, tackifying resins, extenders, stabilizers, pigments, dyes, surfactants, defoamers and biocides. If present, such agents generally constitute up to about 10 weight percent of the total adhesive composition, providing, of course, they do not interfere with the advantages provided by the present disclosure.

The compositions of the present invention may be prepared by forming a uniform dispersion between the adhesion promoter (ii) and the PVAc adhesive emulsion (i) such that the alkoxysilane constitutes from about 0.5 to 5.0 percent by weight of the total composition. The method employed to mix these components is not critical and any commonly used low shear equipment, such as a blade or paddle mixer, is suitable. For the purposes of the present invention, it is preferred that the alkoxysilane constitute from about 1.0 to 2.5 percent by weight of the composition. The adhesion promoter component (ii), in turn, is prepared by forming a homogeneous solution between an alkoxysilane of the present invention and up to about 80 percent by weight of one or more of the above described plasticizers. It has been found that, once component (ii) has been prepared, it is preferred that this mixture be combined with component (i) and used in the respective bonding application as soon as practical. It has also been found that the alkoxysilanes of the present invention must not be prehydrolyzed before they are mixed with the plasticizer. It is thus a requirement of the present invention that, when a plasticizer is included in the adhesion promoter, it is mixed with the alkoxysilane before being incorporated into the water-borne adhesive emulsion. While not wishing to be bound by any theory, it is believed that, in this manner, the alkoxysilane is protected from premature hydrolysis by the water in component (i).

When the adhesion promoter consists essentially of only the alkoxysilane (i.e., no plasticizer is added), it is even more critical that the adhesive composition be used before the alkoxysilane has an opportunity to hydrolyze to an appreciable extent. In this case, the R group may advantageously be selected from radicals which are less prone to hydrolysis in these alkoxysilanes, such as ethyl and isopropyl. In any event, once components (i) and (ii) are mixed to form the compositions of the present invention, it is preferred to use these adhesives as soon as practical.

In highly preferred embodiments of the present invention, about 40 parts by weight of an alkoxysilane selected from the above described formulas (I) or (III), in which R is the methyl radical, is mixed with about 60 parts by weight of a polymeric ester plasticizer for PVAc to form the adhesion promoter component (ii). This adhesion promoter is then added to a water-borne emulsion adhesive based on poly(vinyl acetate) homopolymer having a solids content between about 45 and 55% by weight such that the alkoxysilane constitutes from about 1.0 to 2.5 percent by weight of the total composition.

The compositions of the present invention find utility in any of the bonding applications ordinarily associated with unmodified poly(vinyl acetate) water-borne emulsion adhesives. These applications predominantly involve the bonding of cellulosic substrates such as wood and paper, wherein the adhesive generally comprises a homopolymer of poly(vinyl acetate) and partially hydrolyzed poly(vinyl alcohol) as a protective colloid, as is well known in the art. The compositions of the present invention are particularly suitable in bonding wood products, especially when water resistance is of concern. Other substrates which may be bonded by the compositions of the present invention include porous materials such as cloth, leather and ceramics, wherein the adhesive selected is again generally based on homopolymer PVAc, and non-porous materials such as plastics and metals, wherein the adhesive is usually based on a copolymer or terpolymer of vinyl acetate.

EXAMPLES

The following examples are presented to further illustrate the compositions of this invention, but are not to be construed as limiting the invention, which is delineated in the appended claims. All parts and percentages in the examples are on a weight basis unless indicated to the contrary.

The compositions of the present invention were prepared with the following two alkoxysilanes:

Silane A

An aminoorgano functionalalkoxysilane, having the structure

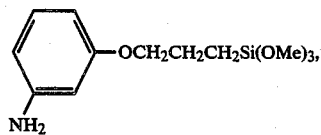

in which Me denotes the methyl radical, was prepared as follows. To 55 grams (0.5 mole) of m-aminophenol, there was added 20 grams of NaOH along with 20 grams of water and a solvent mixture consisting of 100 grams of dimethylsulfoxide and 100 grams of toluene. This mixture was heated to distill off the water (azeotrope formed with the solvents). At this point, 100 grams of 3-chloropropyltrimethoxysilane was added and the resulting mixture was stirred at a temperature of about 120° C. for 4 hours. The salt formed during the reaction was filtered off after the reaction mixture was cooled to room temperature and the remaining liquid was distilled to separate the product from the solvents. There was thus recovered 57 grams of product having a residual odor of dimethylsulfoxide which had a boiling point of 170°–180° C. at 0.5 mm Hg.

Silane B

To 300 grams of N-allylaniline there was added 20 drops of a 1% platinum catalyst and the mixture was heated to 130° C. There was then added 280 grams of trimethoxysilane and this reaction mixture was heated at reflux for about 6 hours. Distillation of the reaction mixture provided 290 grams of an alkoxysilane having the structure

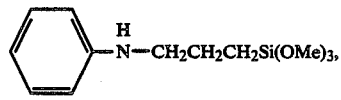

in which Me denotes the methyl radical. This alkoxysilane had the following physical characteristics: boiling point of 140°–160° C. at 2 mm Hg; density of 1.069 grams/cc at 25° C.; refractive index of 1.5115 at 25° C.; and viscosity of 20 cS at 25° C.

Other alkoxysilanes, similar to SILANE A and SILANE B, were employed in comparison compositions and had the following structures, in which Me and Et denote the methyl and ethyl radicals, respectively:

SILANE C
HCl.CH$_2$=CH—⟨⟩—N—CH$_2$CH$_2$NCH$_2$CH$_2$Si(OMe)$_3$
                    H
                    +

SILANE D
CH$_2$=C(Me)C(O)OCH$_2$CH$_2$N(Me$_2$)CH$_2$CH$_2$CH$_2$Si(OMe)$_3$  Cl$^-$

SILANE E
CH$_2$=C(Me)C(O)OCH$_2$CH$_2$CH$_2$Si(OMe)$_3$

SILANE F
H$_2$NCH$_2$CH$_2$NCH$_2$CH$_2$CH$_2$Si(OMe)$_3$
         H

SILANE G
⟨⟩—Si(OMe)$_3$

SILANE H
C$_{18}$H$_{37}$N(Me$_2$)CH$_2$CH$_2$CH$_2$Si(OMe)$_3$  Cl$^-$
         +

SILANE I
HOCH$_2$CH$_2$CH$_2$Si(OMe)$_3$

SILANE J
H$_2$NCH$_2$CH$_2$CH$_2$Si(OEt)$_3$

SILANE K
⟨⟩—N—CH$_2$CH$_2$CH$_2$CH$_2$Si(OMe)$_3$.
    H

EXAMPLES 1–19

Each of the above alkoxysilanes was mixed with a plasticizer for polyvinyl acetate (PVAc), PLASTHALL P-622 (C. P. Hall Company, Chicago, IL) in the ratio of 40 parts alkoxysilane to 60 parts plasticizer. PLASTHALL P-622 is described as a clear liquid polyester plasticizer having a Gardner color of <1, saponification value of 507, acid value of 26.5, viscosity of 5,900 cP, specific gravity of 1.18 and refractive index of 1.4747, the last three measurements being at 25° C. Each of these mixtures was subsequently dispersed in a PVAc adhesive, CASCOREZ WB-864 (Borden Chemical Co., Columbus, OH), at a concentration of 5% based on the total adhesive composition. CASCOREZ WB-864 is described as a ready to use polyvinyl acetate emulsion adhesive having a density of 9.1 lb/gal., a solids content of 55+/−1%, a pH of 4–5, and a viscosity of 1,800–2,500 cP at 25° C.

The above mixtures were used to form laminates from 1 inch wide×3 inch long×⅛ inch thick strips of birch wood. In this procedure, two such strips were butted end-to-end on a flat surface and a third strip, previously coated with one of the adhesive compositions, was placed symmetrically over the butt joint so as to provide two lap joints having a total adhesive contact area of 1×3=3 square inches. The laminates were clamped in a vise and air dried at room temperature for 5 days. Five such lap shear laminate structures were prepared for each adhesive composition. After drying, any excess adhesive in the butted region was removed by carefully sawing through the butted area just up to the top wood strip. The laminates were then soaked in water at 65° C. for 24 hours. These laminates were tested immediately after the water soak (i.e., while still wet) by pulling the two butted wood strips apart in an Instron testing machine. The average shear strength (reported in lb/sq. in.) of the adhesives of the present invention (Examples 1–5), as well as (Comparative) Examples 6–19, are shown in Table 1, below.

TABLE 1

Shear Strength of PVAc-Bonded Wood Laminates

| Adhesive | Alkoxy-silane Used | Lap Shear Strength (psi) | Notes |
|---|---|---|---|
| Example 1 | SILANE A | 58 | — |
| Example 2 | SILANE B | 48 | — |
| Example 3 | SILANE B | 38 | 1 |
| Example 4 | SILANE B | 40 | 2 |
| Example 5 | SILANE B | 27 | 3 |
| Example 6 (Comparative) | SILANE B | 0* | 4 |
| Example 7 (Comparative) | SILANE C | 16 | — |
| Example 8 (Comparative) | SILANE C | 18 | 5 |
| Example 9 (Comparative) | SILANE C | 13 | 1 |
| Example 10 (Comparative) | SILANE C | 4 | 1, 5 |
| Example 11 (Comparative) | SILANE D | 0 | — |
| Example 12 (Comparative) | SILANE E | 4 | — |
| Example 13 (Comparative) | SILANE F | 6 | — |
| Example 14 (Comparative) | SILANE G | 0 | — |
| Example 15 (Comparative) | SILANE H | 0 | — |
| Example 16 (Comparative) | SILANE I | 0 | — |
| Example 17 (Comparative) | SILANE J | 14 | — |
| Example 18 (Comparative) | SILANE J | 14 | 2 |
| Example 19 | None | 0 | — |

Notes
1 = Adhesive aged 2 weeks before forming laminate.
2 = Only 5% silane added to adhesive (i.e., no plasticizer used)
3 = Silane/plasticizer combination aged 2 weeks at R.T. before adding to adhesive.
4 = Silane was pre-hydrolyzed before mixing w/ plasticizer with 5% water for 72 hours at R.T.
5 = Silane/plasticizer combination aged at 60° C./5 months before adding to adhesive.
*A value of 0 for shear strength indicates that the joints fell apart and could not be tested.

It can be seen from Table 1 that the compositions of the present invention result in significantly improved lap shear strength of the wood laminates after they have been soaked in water.

EXAMPLES 20–21

The procedures of the above examples were repeated wherein SILANE B was directly compared with SILANE K. In this case, a different testing machine was employed at a pull rate of 2 inches/minute. Under these conditions, the laminate formed with the adhesive composition containing the SILANE B/ plasticizer combination had a shear strength of 17.0 psi while the laminate with the SILANE K/plasticizer combination had a strength of only 10.8 psi.

EXAMPLES 22–26

SILANE B was combined with the above described plasticizer, again in the ratio of 40 parts silane to 60 parts plasticizer, and added to another PVAc adhesive, CASCOREZ WB-732 (Borden Chemical Co., Columbus, OH) as shown in Table 2. CASCOREZ WB-732 is described as a polyvinyl acetate emulsion adhesive having a solids content of 48%, a pH of 4.5 - 5.5, and a viscosity of 3,900–4,100 cP at 25° C.

Additionally, similar adhesive compositions which employed no SILANE B, or only SILANE B but no plasticizer, were prepared. These formulations are also presented in Table 2.

The above adhesive compositions were tested by gluing three-ply 1/20 yellow birch plywood blocks together and pulling them apart per ASTM test method D 905–49. In this method, the adhesive compositions were applied as a single spread at 35 pounds of mixed glue per 1,000 square feet of glue line. The blocks were pressed together for 1 hour at 150 psi and aged 14 days at room temperature before testing for shear strength. The results are also reported in Table 2, wherein "% wood failure" indicates the fraction of the joint failure which occurred in the wood (rather than in the adhesive) multiplied by 100. None of the samples passed water soak tests relative to delamination and edge failure (i.e., at least some splaying of laminate edges was observed in each case).

TABLE 2

Shear Strength of CASCOREZ WB-732 Laminates

| Adhesive Composition (Parts) | Example 22 | Example 23 | Example 24 | Example 25 | (Comparative) Example 26 |
|---|---|---|---|---|---|
| WB-732 Adhesive | 100 | 100 | 100 | 100 | 100 |
| SILANE B | 2 | 3 | — | — | — |
| SILANE B/ Plasticizer Mix | — | — | 5 | 8 | — |

TABLE 2-continued

Shear Strength of CASCOREZ WB-732 Laminates

| Adhesive Composition (Parts) | Example 22 | Example 23 | Example 24 | Example 25 | (Comparative) Example 26 |
|---|---|---|---|---|---|
| Shear Strength (psi) | 500 | 705 | 720 | 680 | 515 |
| % Wood Failure (%) | 75 | 45 | 85 | 15 | 15 |

It can be seen that the compositions of this invention provide improved adhesion as evidenced by higher shear strength or greater % wood failure, or both.

EXAMPLES 27-29

The procedures of Examples 22-26 were repeated using adhesive compositions based on yet another PVAc adhesive, CASCOREZ WB-851 (Borden Chemical Co., Columbus, OH). CASCOREZ WB-851 is described as a polyvinyl acetate emulsion adhesive having a solids content of 49%, a pH of 4.0 - 5.0, and a viscosity of 5,500-6,500 cP at 25° C. In this case, only compositions using SILANE B (i.e., without the plasticizer) were compared with a composition employing only the CASCOREZ WB-851. These compositions, and test results per ASTM D 905-49, are shown in Table 3. Here too, none of the samples passed water soak tests relative to delamination and edge failure.

TABLE 3

Shear Strength of CASCOREZ WB-851 Laminates

| Adhesive Composition (Parts) | Example 27 | Example 28 | (Comparative) Example 29 |
|---|---|---|---|
| WB-851 Adhesive | 100 | 100 | 100 |
| SILANE B | 2 | 3 | — |
| Shear Strength (psi) | 575 | 475 | 385 |
| % Wood Failure (%) | 25 | 30 | 5 |

Again, it can be seen from Table 3 that the compositions of this invention provide higher shear strength and greater % wood failure.

We claim:

1. A composite wood structure bonded by a composition comprising:
   (i) a water-borne emulsion adhesive based on a poly(vinyl acetate) resin; and
   (ii) an adhesion promoter consisting essentially of at least one alkoxysilane selected from

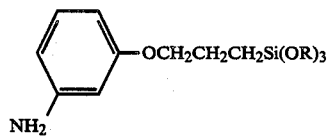

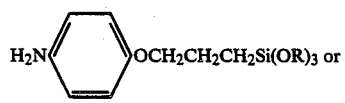

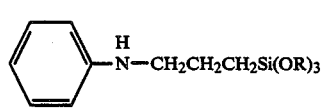

in which R is independently selected from alkyl or alkoxyalkyl radicals having 1-4 carbon atoms, and from about 1 to 80% by weight of a plasticizer for said poly(vinyl acetate) resin, wherein said alkoxysilane constitutes from about 0.5 to 5.0 percent by weight of said composition.

2. The structure of claim 1, wherein said poly(vinyl acetate) resin is a homopolymer of vinyl acetate.

3. The structure of claim 2, wherein said plasticizer is a polyester plasticizer for said poly(vinyl acetate) resin.

4. The structure of claim 3, wherein said alkoxysilane is selected from

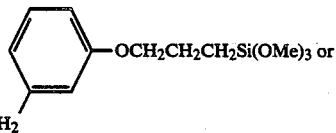

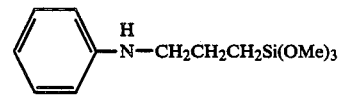

in which Me denotes a methyl radical.

5. The structure of claim 4, wherein said plasticizer constitutes from 10 to 80 percent by weight of said adhesion promoter (ii).

6. The structure of claim 5, wherein said alkoxysilane constitutes from about 1.0 to 2.5 percent by weight of said composition.

7. The structure of claim 1, wherein said plasticizer is selected from dibutyl phthalate, dipropylene glycol, diphenyl phosphate, triphenyl phosphate, dibutyl sebacate, diethylene glycol dibenzoate, dipropylene glycol dibenzoate or butyl benzyl phthalate.

8. The structure of claim 7, wherein said poly(vinyl acetate) resin is a homopolymer of vinyl acetate.

9. The structure of claim 8, wherein said alkoxysilane is selected from

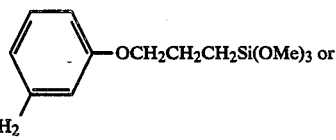

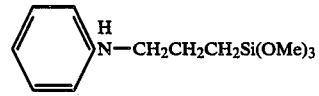

in which Me denotes a methyl radical.

10. A composite wood structure bonded by a composition comprising:
    (i) a water-borne emulsion adhesive based on a poly(vinyl acetate) resin; and
    (ii) an adhesion promoter consisting essentially of at least one alkoxysilane selected from

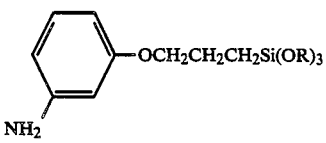

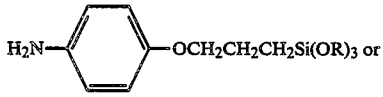

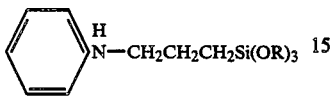

in which R is independently selected from alkyl or alkoxyalkyl readicals having 1-4 carbon atoms, wherein said alkoxysilane constitutes from about 0.5 to 5.0 percent by weight of said composition.

11. The structure of claim 10, wherein said poly(vinyl acetate) resin is a homopolymer of vinyl acetate.

12. The structure of claim 11, wherein said alkoxysilane is selected from

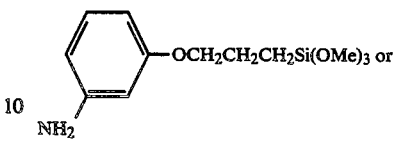

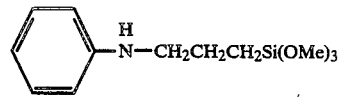

in which Me denotes a methyl radical.

13. The structure of claim 12, wherein said alkoxysilane constitutes from about 1.0 to 2.5 percent by weight of said composition.

* * * * *